(12) United States Patent
Takano et al.

(10) Patent No.: US 10,297,813 B2
(45) Date of Patent: May 21, 2019

(54) ELECTRODE MEMBER, CURRENT COLLECTING PLATE, AND BATTERY BLOCK

(71) Applicant: Panasonic Intellectual Property Management Co., Ltd., Osaka (JP)

(72) Inventors: Akira Takano, Osaka (JP); Daisuke Kishii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 164 days.

(21) Appl. No.: 15/326,507

(22) PCT Filed: Oct. 21, 2015

(86) PCT No.: PCT/JP2015/005295
§ 371 (c)(1),
(2) Date: Jan. 16, 2017

(87) PCT Pub. No.: WO2016/072054
PCT Pub. Date: May 12, 2016

(65) Prior Publication Data
US 2017/0214033 A1 Jul. 27, 2017

(30) Foreign Application Priority Data
Nov. 4, 2014 (JP) .................................. 2014-223885

(51) Int. Cl.
*H01M 2/34* (2006.01)
*H01M 2/20* (2006.01)
(Continued)

(52) U.S. Cl.
CPC .......... *H01M 2/34* (2013.01); *H01H 85/0241* (2013.01); *H01H 85/08* (2013.01);
(Continued)

(58) Field of Classification Search
CPC .... H01M 2/34; H01M 2/206; H01M 10/0525; H01M 2/1077; H01H 85/0241; H01H 85/20; H01H 85/12; H01H 85/08
See application file for complete search history.

(56) References Cited

U.S. PATENT DOCUMENTS

| 2013/0202941 A1 | 8/2013 | Ono et al. |
| 2015/0364744 A1 | 12/2015 | Takano et al. |
| 2015/0380713 A1* | 12/2015 | Kimura ................. H01G 11/10 429/121 |

FOREIGN PATENT DOCUMENTS

| JP | 2014-146516 | 8/2014 |
| JP | 2014-154337 | 8/2014 |

(Continued)

OTHER PUBLICATIONS

International Search Report of PCT application No. PCT/JP2015/005295 dated Jan. 19, 2016.

*Primary Examiner* — Stewart A Fraser
(74) *Attorney, Agent, or Firm* — McDermott Will & Emery LLP (57) ABSTRACT

An electrode member includes a substrate portion formed of a metal thin plate, a connection portion connected to the electrode terminal of a cell, and a fuse for electrically connecting the substrate portion to the connection portion. In the plane orthogonal to the longitudinal direction of the cell, the length of the fuse is greater than the width of the connection portion.

15 Claims, 8 Drawing Sheets

(51) Int. Cl.
  *H01H 85/08*   (2006.01)
  *H01H 85/12*   (2006.01)
  *H01H 85/20*   (2006.01)
  *H01H 85/02*   (2006.01)
  *H01M 2/10*    (2006.01)
  *H01M 10/0525* (2010.01)
  *H01M 10/625*      (2014.01)
  *H01M 10/643*      (2014.01)
  *H01M 10/617*      (2014.01)

(52) U.S. Cl.
  CPC ............ *H01H 85/12* (2013.01); *H01H 85/20* (2013.01); *H01M 2/1077* (2013.01); *H01M 2/206* (2013.01); *H01M 10/0525* (2013.01); *H01H 2231/026* (2013.01); *H01M 10/617* (2015.04); *H01M 10/625* (2015.04); *H01M 10/643* (2015.04); *H01M 2200/103* (2013.01); *H01M 2220/10* (2013.01); *H01M 2220/20* (2013.01)

(56) References Cited

FOREIGN PATENT DOCUMENTS

WO  2012/164884      12/2012
WO  WO-2014122893 A1 *  8/2014   ............ H01G 11/10

\* cited by examiner

ELECTRODE MEMBER, CURRENT COLLECTING PLATE, AND BATTERY BLOCK

TECHNICAL FIELD

The present disclosure relates to an electrode member, a current collecting plate, and a battery block.

BACKGROUND ART

As a power source for driving a motor of an electric car or the like, or as a power source for household use or industrial use, a battery module is employed whose charge capacity and output voltage are increased by interconnecting a plurality of cells in parallel or in series. In the battery module, electrode terminals of the plurality of cells are connected to a common current collecting plate. When an excessive current flows through one of the plurality of cells, the battery module can be short-circuited by itself. In order to prevent the short-circuit, a fuse for disconnecting the current collecting plate from a cell is disposed.

CITATION LIST

Patent Literature

PTL 1: International Patent Publication No. 2012/164884

SUMMARY OF THE INVENTION

Patent Literature 1 discloses a fuse plate including a metal plate, a connection portion connected to a cell, a fuse portion, and an insulating resin film The fuse portion of Patent Literature 1 is formed of a fine metal wire, the insulating resin film is bonded to the fuse portion in order to prevent vibration from cutting the fuse portion. However, employing the insulating resin film increases the number of components and increases the man-hour.

An electrode member of the present invention includes a substrate portion formed of a metal thin plate, a connection portion connected to an electrode terminal of a cell, and a fuse for electrically connecting the substrate portion to the connection portion. In the plane orthogonal to the longitudinal direction of the cell, the length of the fuse is greater than the width of the connection portion.

The electrode member of the present invention has a configuration advantageous for securing the length of the fuse and absorbing vibration.

DESCRIPTION OF EMBODIMENTS

Hereinafter, examples of the exemplary embodiments are specifically described with reference to the accompanying drawings. In the reference drawings, duplicate description of substantially the same component is sometimes omitted.

First Exemplary Embodiment

Figure 1:
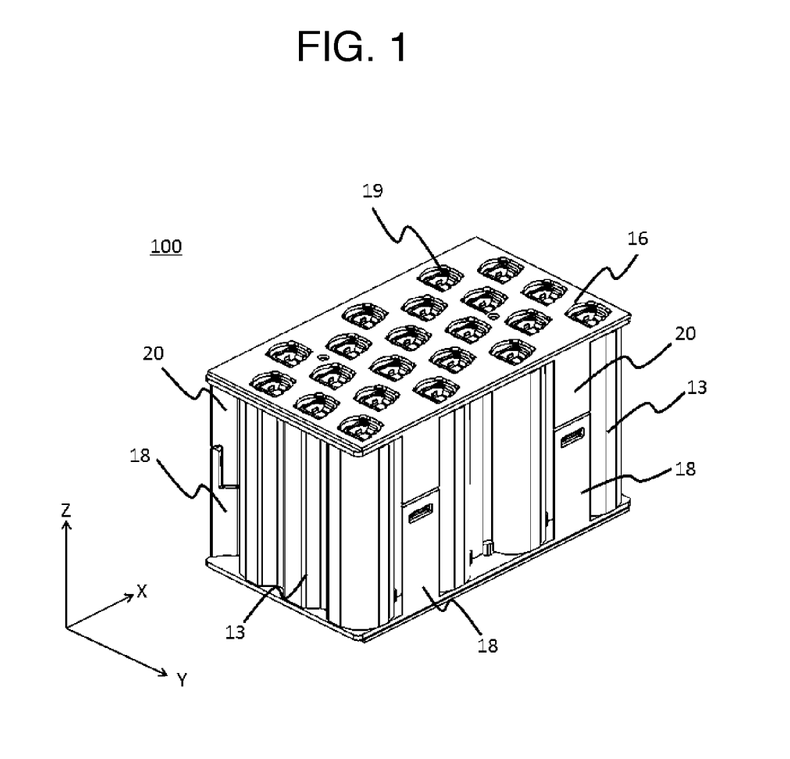
FIG. 1 is a perspective view showing the appearance of a battery block in accordance with a first exemplary embodiment.
Figure 2:
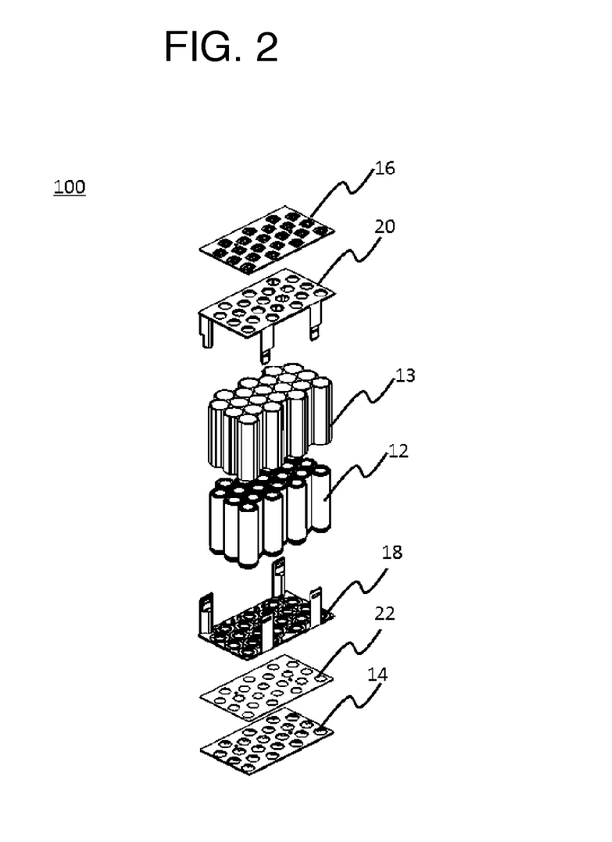
FIG. 2 is an exploded perspective view of the battery block.
Figure 3:
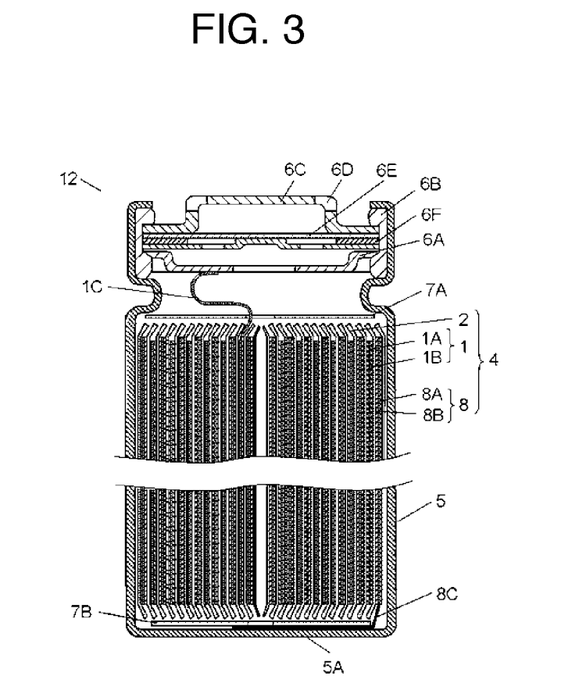
FIG. 3 is a sectional view of a cell.
Figure 4:
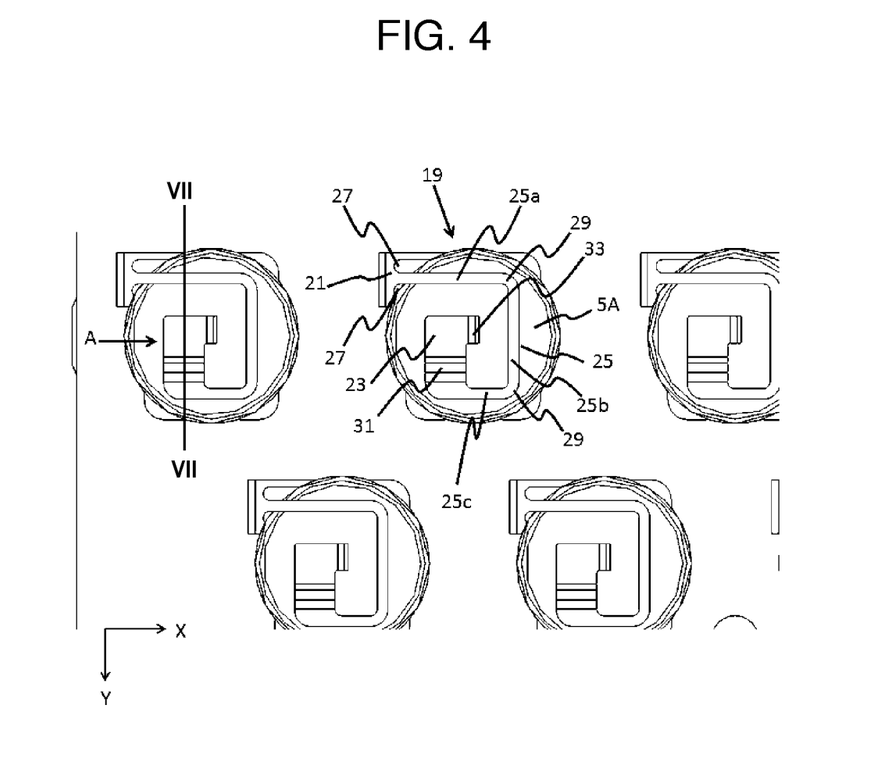
FIG. 4 is a partially enlarged view of the battery block when electrode members are viewed from above in accordance with the first exemplary embodiment.
Figure 5:
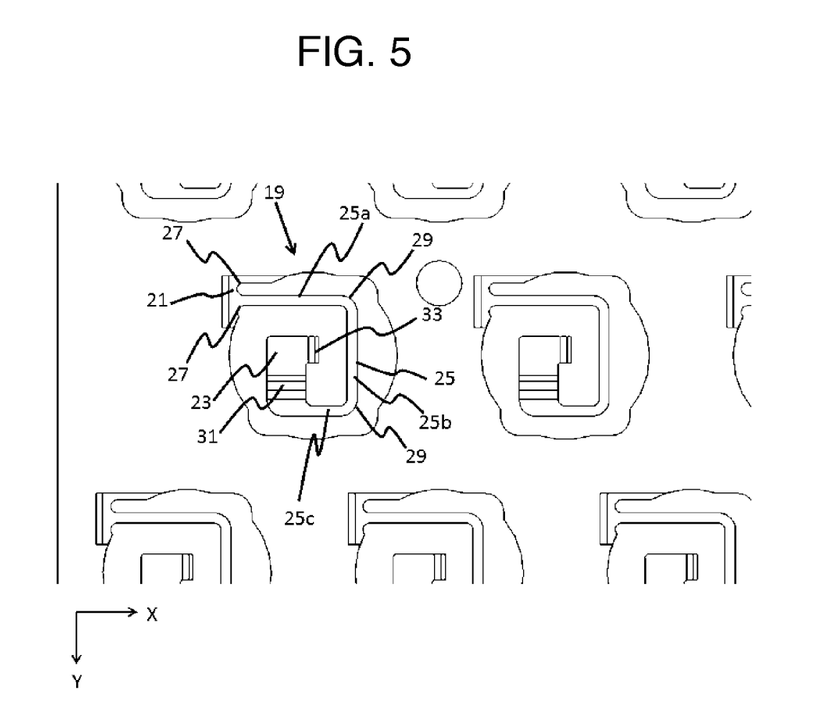
FIG. 5 is a top view of the electrode members.
Figure 6:
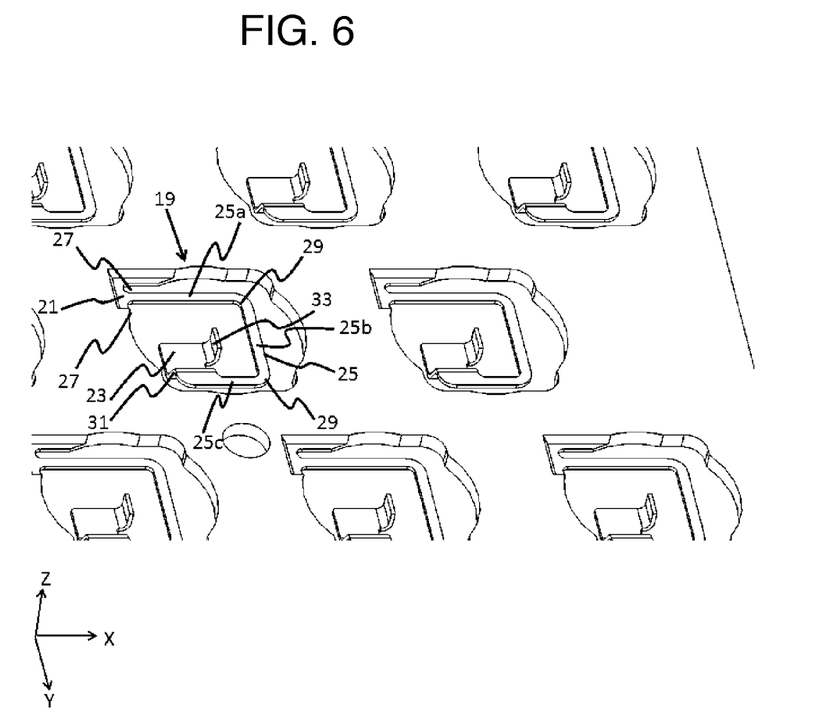
FIG. 6 is a perspective view of the electrode members.
Figure 7:
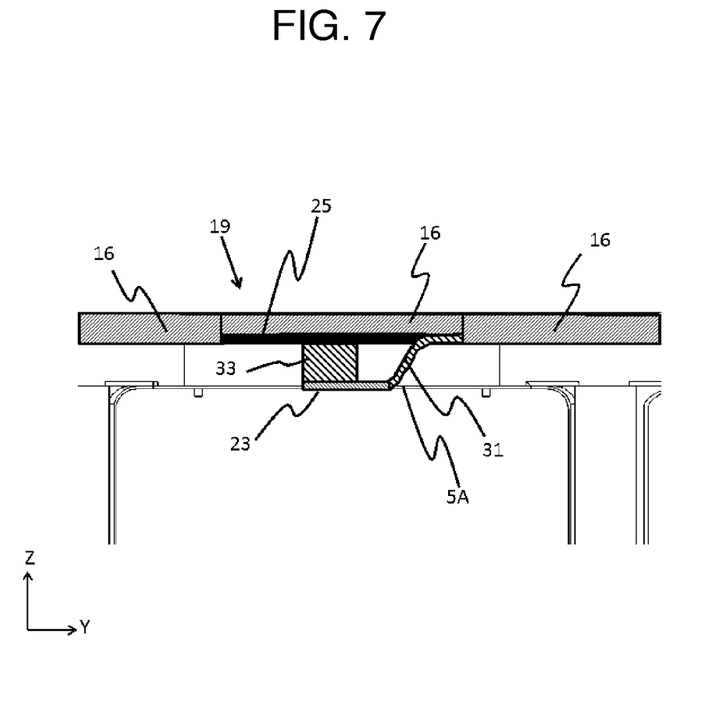
FIG. 7 is a sectional view taken along line VII-VII of FIG. 4 in accordance with the first exemplary embodiment, and the sectional view is viewed from the direction of arrow A of FIG. 4.

The first exemplary embodiment is described using FIG. 1 to FIG. 7. FIG. 1 is a perspective view of battery block 100 in accordance with the first exemplary embodiment. FIG. 2 is an exploded perspective view of battery block 100. FIG. 3 is a sectional view of cell 12. FIG. 4 is a partially enlarged view of battery block 100 when electrode members 19 are viewed from above in accordance with the first exemplary embodiment. FIG. 5 is a top view of electrode members 19. FIG. 6 is a perspective view of electrode members 19. FIG. 7 is a sectional view taken along line VII-VII of FIG. 4, and the sectional view is viewed from the direction of arrow A of FIG. 4. FIG. 1 defines, as three axial directions orthogonal to each other, length direction X, width direction Y, and height direction Z. Length direction X and width direction Y indicate two-dimensional arrangement directions of cells 12. In the present disclosure, length direction X is along the longer side of battery block 100, and width direction Y is along the shorter side thereof. The height direction indicates the longitudinal direction of cells 12, and the negative-electrode terminal side of cells 12 is defined as the plus direction in the first exemplary embodiment. The three axial directions are also applied to the other drawings in the first exemplary embodiment.

Battery block 100 is formed by interconnecting a plurality of cells 12 in parallel. The plurality of cells 12 are held in holding portions of one battery holder 13. In the first exemplary embodiment, 21 cells 12 are held in one battery holder 13. Battery holder 13 holds cells 12 while the positive electrode terminals of cells 12 are aligned to one side and the negative electrode terminals of cells 12 are aligned to the other side.

Battery holder 13 is molded of a material of a high thermal conductivity to heat-equalize the plurality of cells 12. Battery holder 13 is formed by extrusion-molding a metal mainly made of aluminum, for example. Battery holder 13 includes a plurality of through holes as the holding portions for holding the plurality of cells 12. In the first exemplary embodiment, the plurality of through holes are arranged in a staggered (zigzag) format. Cells 12 held in battery holder 13 are also arranged in a staggered format.

Each cell 12 is a chargeable/dischargeable secondary cell. As the secondary cell, a cylindrical lithium-ion cell is assumed. In addition to the lithium-ion cell, a nickel-metal-hydride cell, an alkaline cell, or a sodium cell may be employed. Cell 12 includes electrode group 4. Electrode group 4 is formed by winding, via separator 2, positive electrode 1 and negative electrode 8 facing positive electrode 1. Positive electrode 1 includes current collector 1A, and positive electrode layer 1B containing a positive electrode active material. Negative electrode 8 includes current collector 8A, and negative electrode layer 8B containing a negative electrode active material. Positive electrode 1 is connected to lead 1C made of aluminum, for example, and negative electrode 8 is connected to lead 8C made of copper, for example. Lead 8C is connected to the inner bottom surface of case 5, so that the outer bottom surface of case 5 serves as negative electrode terminal 5A.

Electrode group 4 is inserted into case 5 while insulating plates 7A and 7B are attached on the upper and lower sides of electrode group 4. An end of lead 1C is welded to sealing plate 6A, and an end of lead 8C is welded to the bottom of case 5. Non-aqueous electrolyte (not shown) for transferring lithium ions is filled in case 5.

The opening end of case 5 is caulked, via gasket 6B, with positive electrode terminal 6C, current blocking member 6F such as a positive temperature coefficient (PTC) element, and sealing plate 6A. Positive electrode terminal 6C includes exhaust port 6D for exhausting gas that is discharged when vent mechanism 6E such as a safety valve is opened due to a failure of electrode group 4.

When a mechanism for exhausting gas is disposed on the negative electrode terminal 5A side, neither vent mechanism 6E nor exhaust port 6D is required.

Battery block 100 includes positive-electrode current collecting plate 14 on the positive electrode terminal 6C side, and negative-electrode current collecting plate 16 on the negative electrode terminal 5A side. Each of positive-electrode current collecting plate 14 and negative-electrode current collecting plate 16 is made of a conductive plate material. Positive-electrode current collecting plate 14 is connected to positive electrode terminals 6C via lead terminals or the like. Negative-electrode current collecting plate 16 is connected to negative electrode terminals 5A via electrode members 19. Positive-electrode current collecting plate 14 and negative-electrode current collecting plate 16 electrically interconnect, in parallel, the plurality of cells 12 included in one battery block.

Positive-side insulating component 18 is disposed between battery holder 13 and positive-electrode current collecting plate 14, and electrically insulates them from each other. Negative-side insulating component 20 is disposed between battery holder 13 and negative-electrode current collecting plate 16, and electrically insulates them from each other. Insulating reinforcing component 22 is disposed between positive-side insulating component 18 and positive-electrode current collecting plate 14. Reinforcing component 22 is made of a glass epoxy resin.

In positive-side insulating component 18 and negative-side insulating component 20, portions corresponding to the electrodes of cells 12 are open. Positive-electrode current collecting plate 14 is electrically connected to positive electrode terminals 6C via the opening portions in positive-side insulating component 18. Negative-electrode current collecting plate 16 is electrically connected to negative electrode terminals 5A via the opening portions in negative-side insulating component 20.

Electrode member 19 is described with reference to FIG. 4 to FIG. 7.

As shown in FIG. 4, electrode members 19 are formed in openings in negative-electrode current collecting plate 16, and are exposed to the outside after battery block 100 is assembled. Each electrode member 19 is in contact with the surface of each negative electrode terminal 5A via each opening in negative-side insulating component 20.

Electrode members 19 are formed in a metal thin plate that has an electric conductivity and constitutes negative-electrode current collecting plate 16, and are arranged at positions corresponding to cells 12. Electrode members 19 are formed integrally with negative-electrode current collecting plate 16, by press-punching, rolling, and bending the metal thin plate constituting negative-electrode current collecting plate 16.

Each electrode member 19 includes: substrate portion 21 formed of a metal thin plate having an electric conductivity; connection portion 23 connected to a surface of negative electrode terminal 5A; fuse 25 for electrically connecting substrate portion 21 to connection portion 23 via folded portion 31; folded portion 31 for electrically connecting connection portion 23 to fuse 25; and knob 33 disposed in connection portion 23.

Electrode members 19 are formed by press-punching, rolling, and bending the metal thin plate constituting negative-electrode current collecting plate 16. During the rolling of the metal thin plate, the metal thin plate is pressed in the minus Z direction, and the thicknesses of electrode members 19 become smaller than the thickness of negative-electrode current collecting plate 16. The thicknesses of electrode members 19 also indicate the thicknesses of fuses 25.

Each substrate portion 21 is disposed between negative-electrode current collecting plate 16 and each fuse 25. On the boundary between substrate portion 21 and negative-electrode current collecting plate 16, a portion of the metal thin plate that has a small thickness in the Z direction is included in substrate portion 21. On the boundary between substrate portion 21 and fuse 25, a portion of the metal thin plate that has a narrow width on the XY plane is included in fuse 25.

Substrate portion 21 in FIG. 4 includes, on the boundary between it and fuse 25, cutout portion 27 that is recessed on the negative-electrode current collecting plate 16 side. When cutout portion 27 is not disposed, and when the angle formed by substrate portion 21 and fuse 25 is a right angle for example, the right angle portion can be cracked by vibration. By disposing cutout portion 27, crack of electrode member 19 by vibration can be suppressed.

Fuse 25 electrically connects substrate portion 21 to connection portion 23. Fuse 25 is a portion of electrode member 19 that has a narrow line width in FIG. 4. The line width means the width of fuse 25. Fuse 25 includes a plurality of fuse portions. The plurality of fuse portions include first fuse portion 25a, second fuse portion 25b, and third fuse portion 25c. Each of the boundary between first fuse portion 25a and second fuse portion 25b and the boundary between second fuse portion 25b and third fuse portion 25c includes bent portion 29.

When the value of the current flowing into or out of negative electrode terminal 5A exceeds a predetermined threshold, fuse 25 is fused by heat generation and has a function of electrically disconnecting cell 12 from negative-electrode current collecting plate 16. The fusing current of fuse 25 is defined by the length, width, and thickness of fuse 25. The width and thickness can be translated into the cross section of fuse 25, so that it can be said that the fusing current of the fuse can be defined by the length and cross section of fuse 25. The length of fuse 25 means the sum of the following lengths;

the length from the boundary between substrate portion 21 and fuse 25 to the boundary between first fuse portion 25a and second fuse portion 25b;

the length from the boundary between first fuse portion 25a and second fuse portion 25b to the boundary between second fuse portion 25b and third fuse portion 25c; and the length from the boundary between second fuse portion 25b and third fuse portion 25c to the boundary between fuse 25 and folded portion 31.

The width of fuse 25 means the width of a portion orthogonal to the length portion of fuse 25 on the XY plane. The thickness of fuse 25 means the thickness of fuse 25 in the Z direction.

Here, when the cross section of fuse 25 can be increased, the strength of fuse 25 against vibration can be increased. When fuse 25 is elongated, the stress due to the vibration in the longitudinal direction (Z direction) of cell 12 can be absorbed by the length of fuse 25. In the present exemplary embodiment, the extending direction of fuse 25 from substrate portion 21 is assumed as the X direction, and fuse 25 does not linearly extend to connection portion 23 but extends around connection portion 23. Therefore, this configuration is advantage for elongating fuse 25.

Fuse 25 has the following property. As the length of fuse 25 increases, the fusing current of fuse 25 can be decreased. As the length of fuse 25 decreases, a larger fusing current is required. As the cross section of fuse 25 decreases, the fusing current of fuse 25 can be decreased. As the cross section of fuse 25 increases, a larger fusing current is required.

Therefore, when fuse 25 is long, fuse 25 can be fused with a small fusing current even if the cross section of fuse 25 is increased.

The length of fuse 25 is described. When the length of fuse 25 is greater than the width of connection portion 23, the length of fuse 25 can absorb the stress that is caused by the vibration in the longitudinal direction of cell 12. More preferably, the length of at least one of first fuse portion 25a, second fuse portion 25b, and third fuse portion 25c is made to be greater than the width of connection portion 23. The width of connection portion 23 means the width of connection portion 23 on the XY plane.

Fuse 25 is fused near the center of its length. When bent portion 29 is disposed near the center of the length, fuse 25 can be fused at bent portion 29. In the present exemplary embodiment, fuse 25 can be fused at bent portion 29 disposed on the boundary between first fuse portion 25a and second fuse portion 25b.

Folded portion 31 couples and electrically connects connection portion 23 to fuse 25. Connection portion 23 comes into contact with negative electrode terminal 5A, but fuse 25 and substrate portion 21 are disposed at positions separate from negative electrode terminal 5A in the plus Z direction. Folded portion 31 is folded in the Z direction to connect connection portion 23 to fuse 25. Since folded portion 31 is folded, the following is allowed. When negative-electrode current collecting plate 16 is incorporated into battery block 100, negative-electrode current collecting plate 16 configured integrally with electrode members 19 is electrically connected to negative electrode terminals 5A via openings formed in negative-side insulating plate 9.

The width of folded portion 31 means the size of folded portion 31 in the X direction. Preferably, the width of folded portion 31 is greater than the width of fuse 25. Since the width of folded portion 31 is greater than that of fuse 25, folded portion 31 serves as a strut to separate negative electrode terminal 5A from fuse 25. When folded portion 31 comes into contact with negative electrode terminal 5A in the case that the width of folded portion 31 is narrower than that of fuse 25, a fusing current large enough to fuse folded portion 31 can flow through folded portion 31 to accidentally cut electrode member 19.

Knob 33 is folded in the plus Z direction in the view from connection portion 23. When connection portion 23 is bonded to the surface of negative electrode terminal 5A by welding or the like, the bonded state is checked by picking knob 33. When another method is employed as a method of checking the bonded state, knob 33 is not required.

The shapes of the openings in negative-electrode current collecting plate 16 are described. Here, electrode members 19 are formed in the openings. The shape of each opening in negative-electrode current collecting plate 16 on the XY plane is formed so as to project in the separating direction from each bent portion 29 in the place facing each bent portion 29. The shape of each opening in negative-electrode current collecting plate 16 is formed so as to project in the separating direction from angle 31a of folded portion 31 also in the place facing corner 31a. This shape is employed for securing the insulating distance between fuse 25 and negative-electrode current collecting plate 16.

Second Exemplary Embodiment

Figure 8:
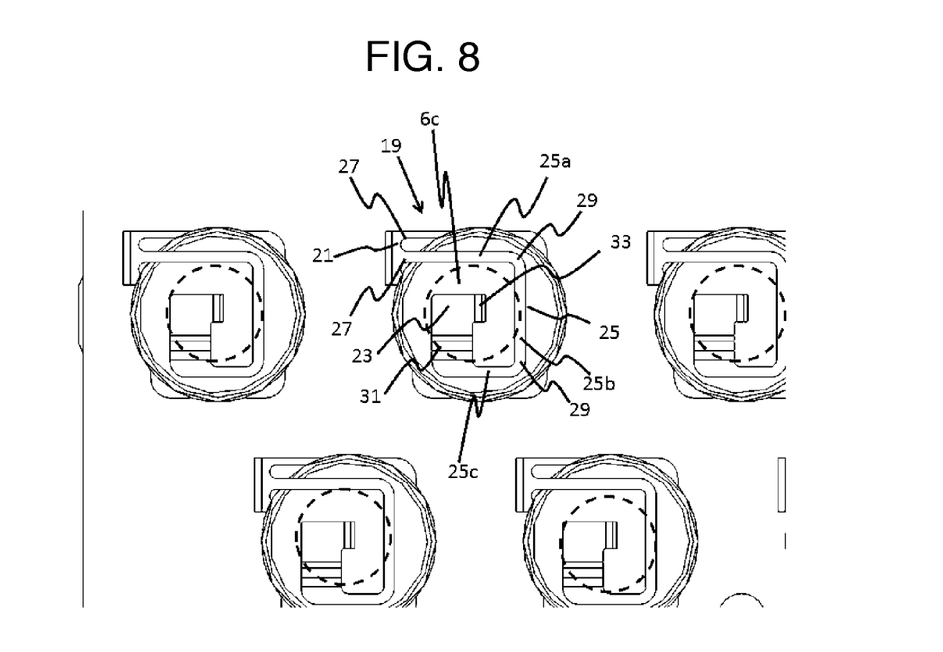
FIG. 8 is a partially enlarged view of a battery block when electrode members are viewed from above in accordance with a second exemplary embodiment.

The first exemplary embodiment has described an example in which electrode members 19 are formed on the negative-electrode current collecting plate 16 side, and are electrically connected to negative electrode terminals 5A. A second exemplary embodiment describes an example in which electrode members 19 are formed on the positive-electrode current collecting plate 14 side, and are electrically connected to positive electrode terminals 6C.

FIG. 8 is a partially enlarged view of a battery block when electrode members are viewed from above in accordance with the second exemplary embodiment. In the second exemplary embodiment, positive-electrode current collecting plate 14 is connected to positive electrode terminals 6C via electrode members 19. Negative electrode terminals 5A are connected to a negative-electrode current collecting plate via lead terminals or the like. In a cell of the second exemplary embodiment, preferably, a mechanism for exhausting gas is disposed on negative electrode terminal 5A side. The other components of the second exemplary embodiment are the same as those of the first exemplary embodiment.

In FIG. 8, positive electrode terminals 6C correspond to portions inside broken lines. Each connection portion 23 is connected to each positive electrode terminal 6C. Each electrode member 19 is disposed so that bent portions 29 do not overlap each positive electrode terminal 6C. Since each electrode member 19 is disposed so that bent portions 29 do not overlap each positive electrode terminal 6C, even if a fuse 25 is fused at bent portion 29, the disconnection portion can be prevented from coming into contact with positive electrode terminal 6C.

Another Item

The first exemplary embodiment and second exemplary embodiment have described electrode members 19 each of which includes two bent portions 29. However, the number of bent portions 29 are not limited to two.

In the first exemplary embodiment and second exemplary embodiment, the angle of bent portion 29 that is formed by first fuse portion 25a and second fuse portion 25b and the angle of bent portion 29 that is formed by second fuse portion 25b and third fuse portion 25c are right angles. However, the angles of the bent portions are not limited to right angles.

In the first exemplary embodiment and second exemplary embodiment, the electrode members are formed integrally with a current collecting plate (positive-electrode current collecting plate or negative-electrode current collecting plate). However, electrode members and a current collecting plate that are produced in the following process can be used. A metal thin plate forming electrode members and a metal thin plate forming a current collecting plate are produced separately from each other, and then these metal thin plates are integrated by welding or the like.

INDUSTRIAL APPLICABILITY

An electrode member of the present disclosure is useful for a battery block constituting a power source for driving a motor of an electric car or the like or a backup power source or the like.

REFERENCE MARKS IN THE DRAWINGS 1 positive electrode
1A, 8A current collector
1B positive electrode layer
1C, 8C lead
2 separator
4 electrode group
5 case
5A negative electrode terminal
6A sealing plate
6B gasket
6C positive electrode terminal
6D exhaust port
6E vent mechanism
6F current blocking member
7A, 7B insulating plate
8 negative electrode
8B negative electrode layer
12 cell
13 battery holder
14 positive-electrode current collecting plate
16 negative-electrode current collecting plate
18 positive-side insulating component
19 electrode member
20 negative-side insulating component
21 substrate portion
22 reinforcing component
23 connection portion
25 fuse
27 cutout portion
29 bent portion
31 folded portion
33 knob
100 battery block

The invention claimed is:

1. An electrode member comprising:
a substrate portion formed of a metal plate;
a connection portion connected to an electrode terminal of a cell; and
a fuse for electrically connecting the substrate portion to the connection portion, wherein:
the fuse is electrically connected to the connection portion via a folded portion,
the folded portion is folded from a plane having the fuse in the longitudinal direction of the cell, and
in the plane orthogonal to the longitudinal direction of the cell, a width of the folded portion is greater than a width of the fuse.

2. The electrode member according to claim 1, wherein:
the connection portion includes a knob, and
the knob is folded from a plane having the connection portion in the longitudinal direction of the cell.

3. The electrode member according to claim 1, wherein, in a plane orthogonal to a longitudinal direction of the cell, a length of the fuse is greater than a width of the connection portion.

4. The electrode member according to claim 3, wherein:
the fuse includes a bent portion, the fuse includes a plurality of fuse portions, the bent portion serving as a boundary between the plurality of fuse portions, and
in the plane orthogonal to the longitudinal direction of the cell, a length of at least one of the plurality of fuse portions is greater than the width of the connection portion.

5. A current collecting plate configured integrally with the electrode member according to claim 4, wherein:
the electrode member is configured integrally with the current collecting plate for electrically interconnecting a plurality of the cells,
the electrode member is disposed in an opening formed in the current collecting plate, and
in the plane orthogonal to the longitudinal direction of the cell, a shape of the opening is formed so as to project in a separating direction from the bent portion in a place facing the bent portion.

6. An electrode member comprising:
a substrate portion formed of a metal plate;
a connection portion connected to an electrode terminal of a cell; and
a fuse for electrically connecting the substrate portion to the connection portion, wherein:
the connection portion includes a knob formed on a portion in the connection portion which differs from a portion connected to the fuse portion in the connection portion, and
the knob is folded from a plane having the connection portion in the longitudinal direction of the cell.

7. The electrode member according to claim 6, wherein, in a plane orthogonal to a longitudinal direction of the cell, a length of the fuse is greater than a width of the connection portion.

8. The electrode member according to claim 7, wherein:
the fuse includes a bent portion, the fuse includes a plurality of fuse portions, the bent portion serving as a boundary between the plurality of fuse portions, and in the plane orthogonal to the longitudinal direction of the cell, and
a length of at least one of the plurality of fuse portions is greater than the width of the connection portion.

9. A current collecting plate configured integrally with the electrode member according to claim 8, wherein:
the electrode member is configured integrally with the current collecting plate for electrically interconnecting a plurality of the cells, and
the electrode member is disposed in an opening formed in the current collecting plate, and in the plane orthogonal to the longitudinal direction of the cell, a shape of the opening is formed so as to project in a separating direction from the bent portion in a place facing the bent portion.

10. A battery block comprising:
an electrode member including a substrate portion formed of a metal plate, a connection portion connected to an electrode terminal of a cell, and a fuse for electrically connecting the substrate portion to the connection portion;
a plurality of the cells; and
a holder for holding the plurality of cells, wherein positive electrode terminals of the plurality of cells are electrically interconnected via a positive-electrode current collecting plate, and wherein the electrode members are disposed in openings in the positive-electrode current collecting plate, the connection portions are connected to the positive electrode terminals of the plurality of cells, and the fuse includes a bent portion disposed so that the bent portion does not overlap the positive electrode terminals.

11. The battery block according to claim 10, wherein, in a plane orthogonal to a longitudinal direction of the cell, a length of the fuse is greater than a width of the connection portion.

12. The battery block according to claim 11, wherein:

the fuse includes a plurality of fuse portions, the bent portion serving as a boundary between the plurality of fuse portions, and in the plane orthogonal to the longitudinal direction of the cell, and a length of at least one of the plurality of fuse portions is greater than the width of the connection portion.

13. The battery block according to claim 12, wherein:

the fuse is electrically connected to the connection portion via a folded portion, the folded portion is folded from a plane having the fuse in the longitudinal direction of the cell, and in the plane orthogonal to the longitudinal direction of the cell, a width of the folded portion is greater than a width of the fuse.

14. The battery block according to claim 12, wherein:

the connection portion includes a knob, and the knob is folded from a plane having the connection portion in the longitudinal direction of the cell.

15. The battery block according to claim 12, wherein:

the electrode member is configured integrally with the current collecting plate for electrically interconnecting a plurality of the cells, and the electrode member is disposed in an opening formed in the current collecting plate, and in the plane orthogonal to the longitudinal direction of the cell, a shape of the opening is formed so as to project in a separating direction from the bent portion in a place facing the bent portion.

* * * * *